(12) United States Patent
Huse

(10) Patent No.: US 6,546,595 B2
(45) Date of Patent: Apr. 15, 2003

(54) HINGE

(75) Inventor: O. C. Huse, Arlington, TX (US)

(73) Assignee: Moeller Marine Products, Twinsburg, OH (US)

( * ) Notice: Subject to any disclaimer, the term of this patent is extended or adjusted under 35 U.S.C. 154(b) by 24 days.

(21) Appl. No.: 09/836,914

(22) Filed: Apr. 17, 2001

(65) Prior Publication Data

US 2001/0054215 A1 Dec. 27, 2001

Related U.S. Application Data

(60) Provisional application No. 60/200,710, filed on Apr. 27, 2000.

(51) Int. Cl.[7] .............................................. E05D 11/10
(52) U.S. Cl. .............................. 16/326; 16/321; 16/334; 16/355
(58) Field of Search ........................ 16/326, 324, 342, 16/331, 334, 355, 374, 386, 321; 297/378.1, 376, 374, 378.12

(56) References Cited

U.S. PATENT DOCUMENTS

| | | | | |
|---|---|---|---|---|
| 4,186,905 A | * | 2/1980 | Brudy ........................... | 16/321 |
| 4,507,098 A | * | 3/1985 | Terzian et al. ............... | 446/288 |
| 4,877,164 A | * | 10/1989 | Baucom ........................ | 16/341 |
| 5,052,076 A | * | 10/1991 | Spaeth ......................... | 16/266 |
| 5,123,768 A | * | 6/1992 | Franklin ....................... | 403/84 |
| 5,228,535 A | * | 7/1993 | McCarty ...................... | 182/163 |
| 5,312,158 A | * | 5/1994 | Wittig et al. ................. | 297/362 |
| 5,334,354 A | * | 8/1994 | Johnston et al. .............. | 16/304 |
| 5,452,938 A | * | 9/1995 | Ernst ........................... | 297/362 |

FOREIGN PATENT DOCUMENTS

WO     WO 01/92054 A1 * 12/2001

* cited by examiner

Primary Examiner—Chuck Y. Mah
(74) Attorney, Agent, or Firm—Howard & Howard

(57) ABSTRACT

A hinge includes a first member, a second member, and a pivot housing. The pivot housing includes an inner housing and an outer housing. The inner housing is fixedly coupled to the first member. The outer housing is fixedly coupled to the second member. The hinge distributes forces acting upon the hinge between the inner and outer housings.

13 Claims, 4 Drawing Sheets

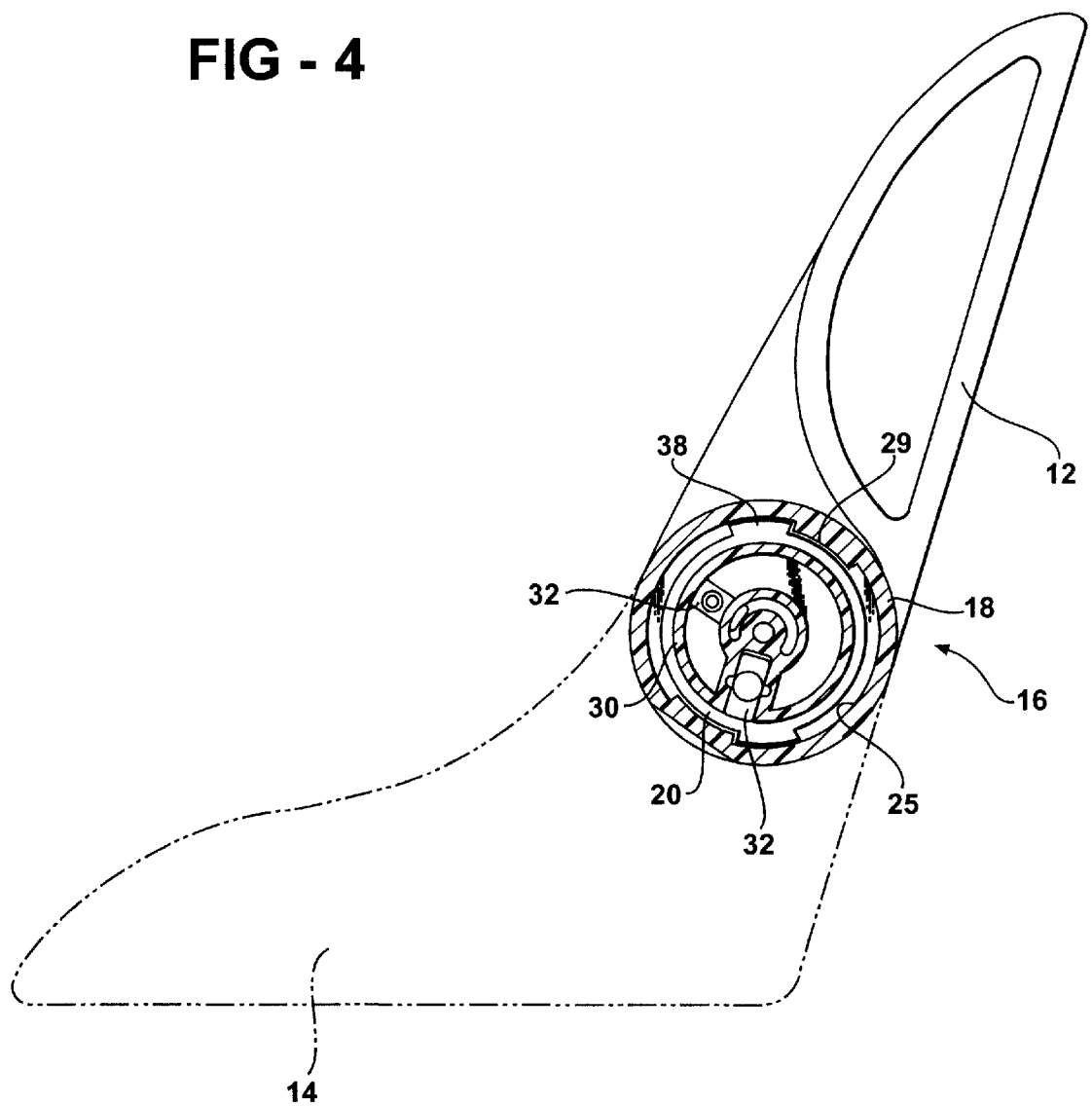

HINGE

CROSS-REFERENCE TO RELATED APPLICATIONS

This application claims the benefit of U.S. Provisional Patent Application Ser. No. 60/200,710, filed Apr. 27, 2000.

BACKGROUND OF THE INVENTION

1. Field of the Invention

The present invention relates generally to hinges, and more particularly, to a hinge which distributes imposed forces to its housing.

2. Description of the Prior Art

Hinges are used for a variety of applications to allow one part to be rotatably moved with respect to a second part. For example, hinges are typically used to couple a seat bottom and seat back of a seat in a motor vehicle, such as an automobile or a boat. The typical hinge includes an upper part connected to the seat back and a lower part connected to the seat bottom. A pin is provided through apertures on both the upper and lower parts. The pin allows the two parts and the seat back and bottom to be rotatably moved relative to the other. However; any forces which are imposed on the seat back, seat bottom, and the upper and lower parts of the hinge are transmitted to the pin.

The present invention is aimed at one or more of the problems identified above.

SUMMARY OF THE INVENTION AND ADVANTAGES

In one aspect of the present invention, a hinge is provided. The hinge includes a first member, a second member, and a pivot housing. The pivot housing includes an inner housing and an outer housing. The inner housing is fixedly coupled to the first member. The outer housing is fixedly coupled to the second member. The hinge distributes forces acting upon the hinge between the inner and outer housings.

In another aspect of the present invention, a hinge is provided. The hinge includes a first member, a second member, and a pivot housing. The pivot housing includes an inner housing and an outer housing. The inner housing is fixedly coupled to the first member. The outer housing is fixedly coupled to the second member. The inner housing includes guide members and the outer housing includes an inner wall. The guide members engage the inner wall to distribute forces acting upon the hinge between the inner and outer housings. A pin is located through apertures in the inner and outer housings and is adapted to maintain the inner and outer housings in a close relationship.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is an illustration of the hinge of Fig. I, wherein the hinge is in an open position;

DETAILED DESCRIPTION OF THE PREFERRED EMBODIMENT

Figure 1:
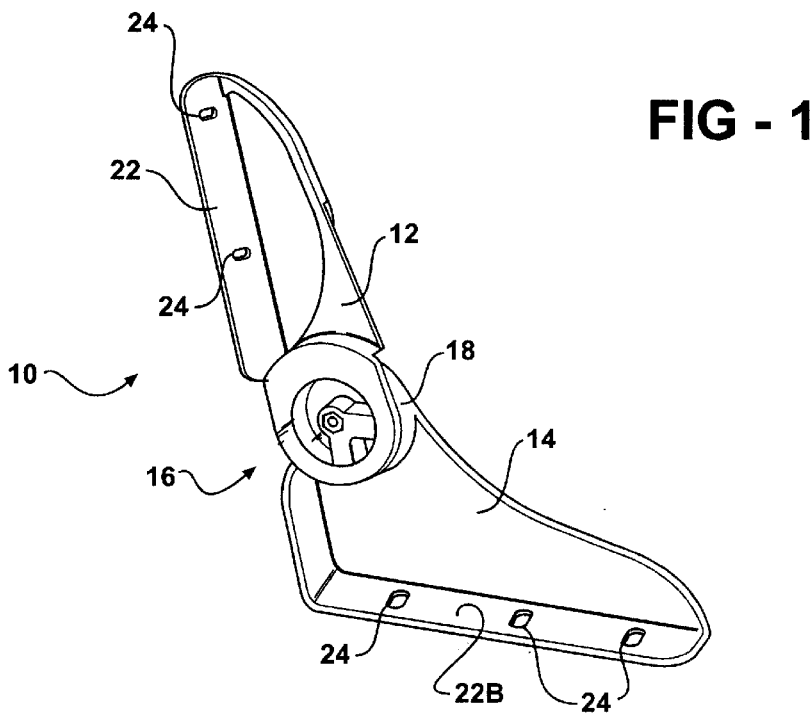
FIG. 1 is an illustration of a hinge having first and second members, according to an embodiment of the present invention.
Figure 2:
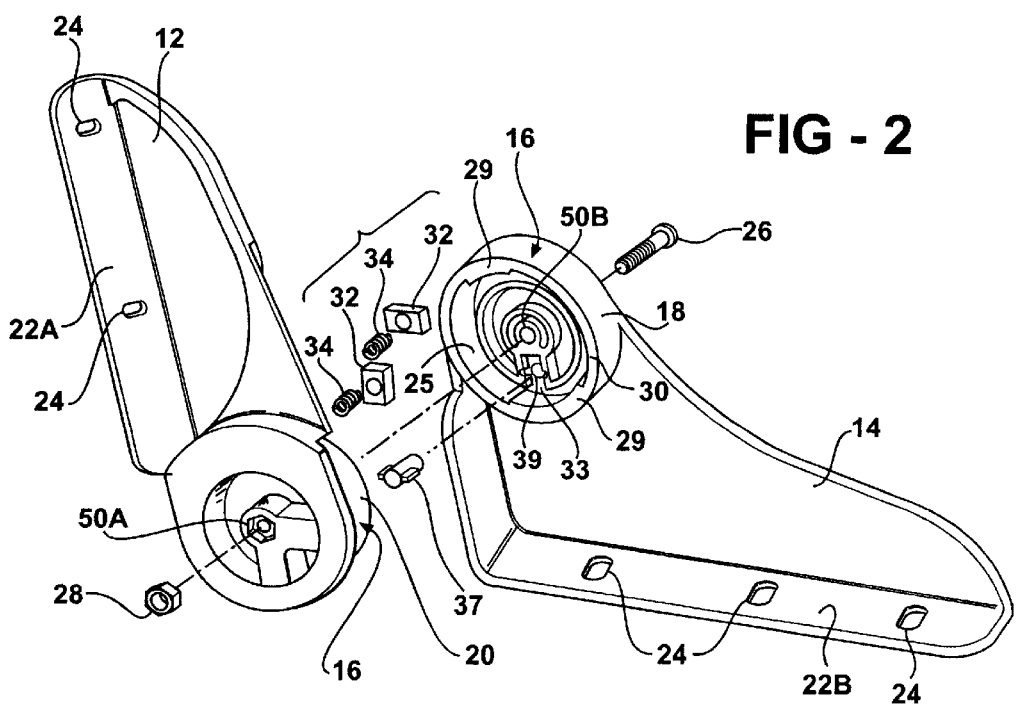
FIG. 2 is a detailed illustration of the first and second members of the hinge of FIG. 1.

With reference to the drawings and in operation, a hinge 10 which distributes forces imposed on the hinge 10, is provided.

The hinge 10 includes a first member 12 and a second member 14. The first member 12 and a second member 14 are joined by a pivot housing, shown generally at 16.

The pivot housing 16 includes an outer housing 18. Preferably, the outer housing 18 is an integral portion of second member 14.

The pivot housing 16 also includes an inner housing 20. Preferably, the inner housing 18 is an integral portion of first member 12. The inner housing 20 is journaled in housing 18 to allow the first and second members 12, 14 to pivot with respect to one another.

It should be appreciated that the first and second members 12, 14 do not need to be to integral to the housings 18, 20. The first and second members 12, 14 can be connected to the housings 18, 20 by any known means, including but not limited to fasteners, adhesives, press fitting, tabs and slots, etc.

The first and second members 12, 14 of the disclosed embodiment include first and second flanges 22A,22B for connecting the hinge 10 to, for example, a top and a bottom of a seat (not shown). The flanges 22A,22B include slots 24 for receipt of fasteners (not shown) for attachment thereto. The slots 24 allow for adjustment of the first and second members 12, 14 with respect to the seat top and/or bottom. It should be understood that the hinge 10 could be used on any application that requires a hinge and is not limited to use on a seat. Furthermore, depending on the application, the flanges could be replaced with other attaching systems, or not used, for example the housings 18, 20 could be integrally formed into the top and bottom portions of a container, such as a toolbox.

A pin 26 is located through apertures 50A, 50B of the inner and outer housings 20, 18 and held in place by a nut 28.

The hinge 10 of the present invention is particularly strong due to the pivot housing 16. Unlike typical hinges, the pin 26 and nut 28 do not support any of the loads experienced by the hinge 10. The entire load is distributed between the outer and inner housings 18, 20.

The outer housing 18 includes an inner wall 25 and stops 29.

The inner housing 20 includes guide members 38. The guide members 38 engage and slide along the inner wall 25. As will be appreciated, the engagement of the guide members 38 against the inner wall 25 distributes the forces between these members and not through the pin 26. The stops 29 and guide members 38 also engage to further distribute the forces between the housings 18, 20. The guides 38 also act against the stops 29 to prevent further pivoting of the first and second members 12, 14 with respect to one another and to further distribute the forces acting on the first and second members 12,14 to the stops 29 and guides 38. As should be appreciated, there is a slight tolerance between the guides 38 and the wall 25 to allow movement between the first and second members 12, 14, but still ensure engagement for properly distributing the forces between the guides 38 and wall 25.

Figure 3:
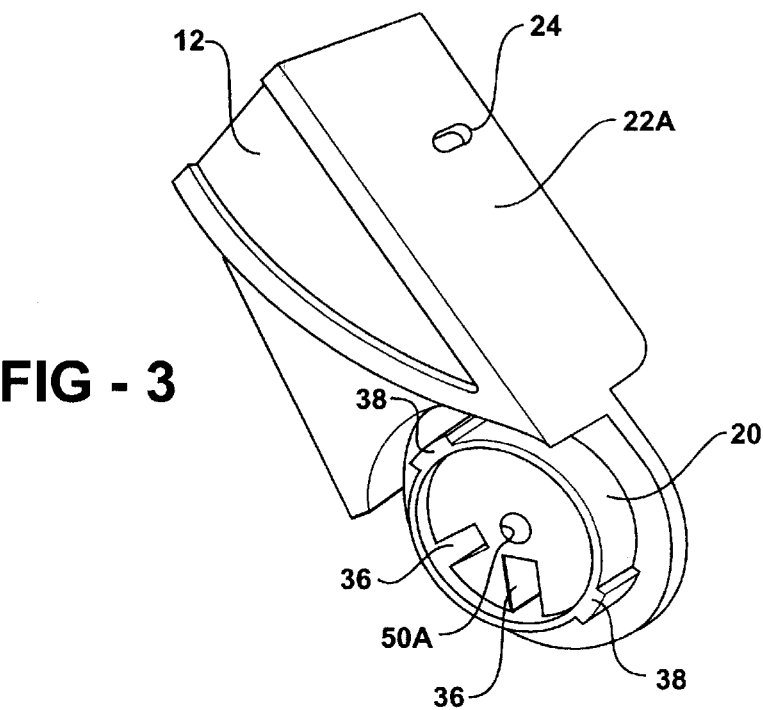
FIG. 3 is if an illustration of a portion of the first member having a inner housing.

In the disclosed embodiment, there are two stops 29 illustrated. Outer housing 18 also has an inner raised wall 30 and notch 33 for selective receipt of locking members 32. A release pin 37 is reciprocally mounted in an opening 39 in notch 33 to release the locking members 32. In the disclosed embodiment, there are two locking members 32 with each being spring biased by the springs 34. The locking members 32 and springs 34 are mounted in the locking cavities 36 in the inner housing 20 (see FIG. 3).

Figure 5:
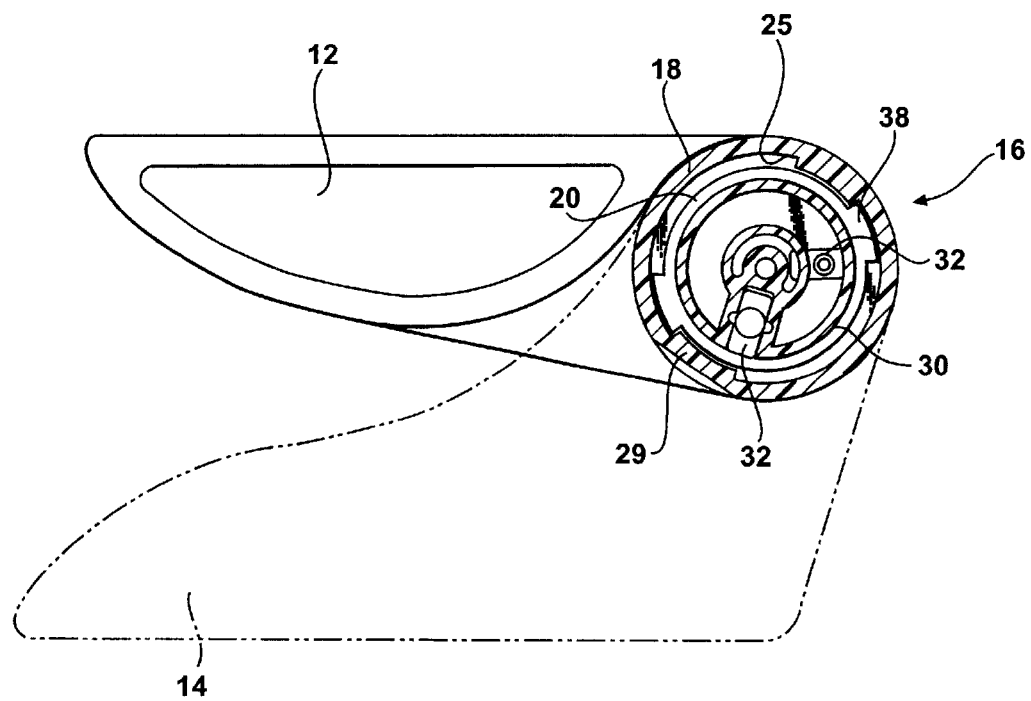
FIG. 5 is an illustration of the hinge of FIG. 1, wherein the hinge is in a closed position.

With reference to FIGS. 4 and 5, the first and second members 12, 14 are illustrated in the two positions, for example open and closed or up and down if it is a hinge on a seat. As illustrated, the locking members 32 are received in the opening 39 corresponding to each of the two positions. It should also be appreciated that the guides 38 are illustrated slightly spaced from the inner wall 25, but it should be appreciated that this is slightly over exaggerated. In the preferred embodiment, the guides 38 engage the walls 25, but permit movement.

Figure 6:
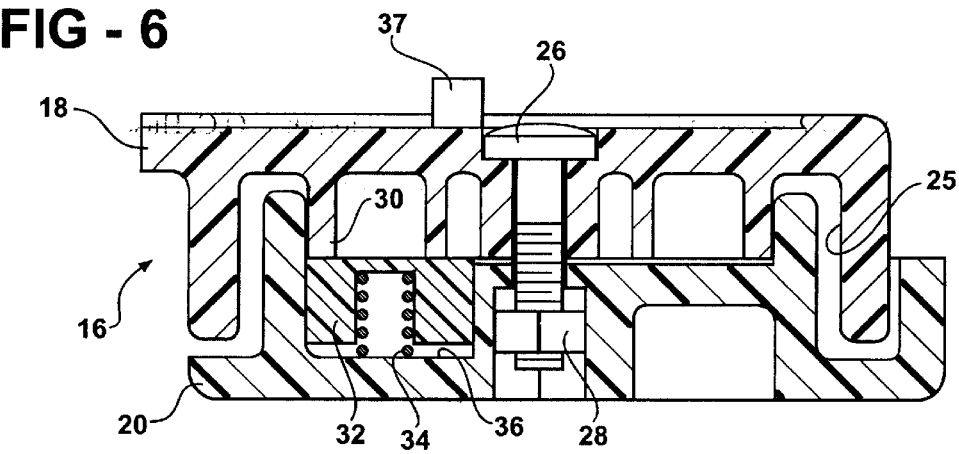
FIG. 6 is a first view of a portion of the hinge of FIG. 1, illustrating a locking feature.
Figure 7:
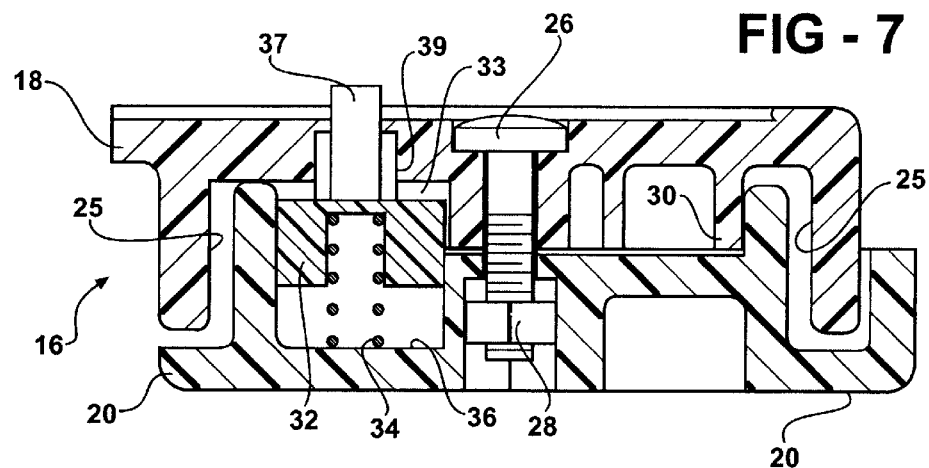
FIG. 7 is a second view of a portion of the hinge of FIG. 1, illustrating a locking feature; and, FIG. 8 is a third view of a portion of the hinge of FIG. 1, illustrating a locking feature.
Figure 8:
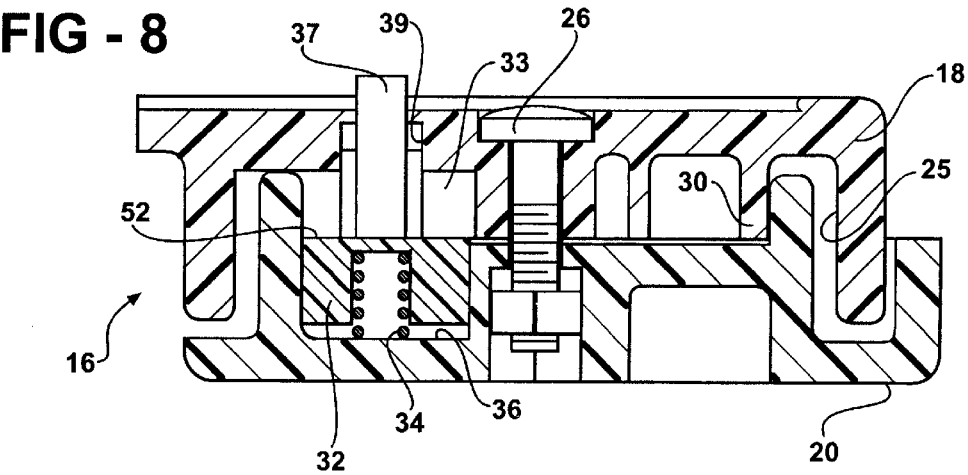

With reference to FIGS. 6–8, the preferred action of the locking members 32 and the action of the release pin 37 are illustrated.

With specific reference to FIG. 6, the operation of the pivot housing 16 will be described. As illustrated, the pivot housing 16 has two locking positions shown in FIGS. 4 and 5. In use, the raised wall 30 of the housing 18 engages the locking members 32 thereby compressing the spring 34 to allow the housings 18, 20 to rotate with respect to one another. In FIG. 6, the inner wall 30 is engaging the locking member 32 compressing the spring 34 and allowing for rotation.

With specific reference to FIG. 7, the locking member 32 is shown in its locking position with spring 34 expanded and locking member 32 received within an opening 39 of the housing 18. The release pin 37 is shown partially depressed.

With specific reference to FIG. 8, the release pin 37 is shown fully depressed thereby forcing locking member 32 into its release position and compressing the pin 34. In this position, the inner wall 30 can slide over a top portion 52 of the locking member 32 allowing the housings 18, 20 to rotate. As will be appreciated, in FIG. 7, the pivot housings 18,20 cannot rotate because the locking member 32 is positioned within the opening 39.

Obviously, many modifications and variations of the present invention are possible in light of the above teachings and the invention may be practiced otherwise than as specifically described within the scope of the appended claims.

What is claimed is:

1. A hinge, comprising:
   a first member;
   a second member;
   a pivot housing having an inner housing and an outer housing, the inner housing being fixedly coupled to the first member and the outer housing being fixedly coupled to the second member, the inner housing defining at least one cavity and the outer housing defining at least one notch;
   a locking member movably disposed within at least one of the cavity and the notch of the inner and outer housings and being biased toward the other of the inner and outer housings such that when the cavity aligns with the notch, the locking member becomes partially disposed within both the cavity and the notch to retain the inner housing in a locking arrangement relative to the outer housing.

2. A hinge, as set forth in claim 1, including a pin located through apertures in the inner and outer housings and being adapted to maintain the inner and outer housings in a close relationship.

3. A hinge, as set forth in claim 1, wherein the inner housing includes guide members and the outer housing includes an inner wall, and wherein the guide members engage the inner wall to distribute forces acting upon the hinge between the pivot housings.

4. A hinge, as set forth in claim 1, wherein the inner housing and the first member are integral and the outer housing and the second member are integral.

5. A hinge, as set forth in claim 1, wherein the first and second members each include flanges.

6. A hinge, as set forth in claim 1, wherein the outer housing includes a stop and the inner housing includes a guide member, the guide member acting against the stop to prevent further relative rotation of the first and second members.

7. A hinge, as set forth in claim 1, wherein the outer housing further defines an opening disposed within said notch and further comprising a release pin located in the opening of the notch to release the locking member from the notch such that the inner housing may rotate relative to the outer housing.

8. A hinge, comprising:
   a first member;
   a second member;
   a pivot housing having an inner housing and an outer housing with the outer housing substantially encompassing the inner housing, the inner housing being fixedly coupled to the first member and the outer housing being fixedly coupled to the second member;
   a pin passing through apertures in the inner and outer housings to maintain the inner and outer housings in an overlapping close relationship;
   a stop located within the outer housing; and
   a guide member located on the inner housing with the guide member selectively acting against the stop to define an abutting position for preventing further relative rotation of the first and second members.

9. A hinge, as set forth in claim 8 wherein the outer housing further defines an inner wall and wherein the guide members engage the inner wall to distribute forces acting upon the hinge between the pivot housings.

10. A hinge, as set forth in claim 8, wherein the inner housing and the first member are integral and the outer housing and the second member are integral.

11. A hinge, as set forth in claim 8, wherein the inner housing defines at least one cavity and the outer housing defines at least one notch.

12. A hinge, as set forth in claim 11, further including a locking member movably disposed within the cavity of the inner housing and being biased toward the outer housing such that when the cavity aligns with the notch, the locking member becomes partially disposed within both the cavity and the notch to retain the inner housing in a locking arrangement relative to the outer housing.

13. A hinge, as set forth in claim 12, wherein the outer housing further defines an opening disposed within said notch and further comprising a release pin located in the opening of the notch to release the locking member from the notch such that the inner housing may rotate relative to the outer housing.

* * * * *